United States Patent [19]

Minato

[11] 3,843,628
[45] Oct. 22, 1974

[54] CARDIOTONIC GLYCOSIDES
[75] Inventor: Hitoshi Minato, Toyonaka, Japan
[73] Assignee: Shionogi & Co., Ltd., Osaka, Japan
[22] Filed: May 11, 1971
[21] Appl. No.: 142,347

Related U.S. Application Data
[63] Continuation-in-part of Ser. No. 833,784, June 16, 1969, abandoned.

[30] Foreign Application Priority Data
June 18, 1968  Japan................................ 43-42160
July 26, 1968  Japan................................ 43-53256

[52] U.S. Cl............................. 260/210.5, 424/182
[51] Int. Cl.......................................... C07c 173/00
[58] Field of Search................................. 260/210.5

[56] References Cited
UNITED STATES PATENTS
3,432,486  3/1969  Minato............................. 260/210.5
3,514,441  5/1970  Satoh et al....................... 260/210.5
3,531,462  9/1970  Satoh et al....................... 260/210.5

OTHER PUBLICATIONS
Minato et al., "Jour. Chem. Soc.," 1966, pp. 377–379.

Primary Examiner—Johnnie R. Brown
Attorney, Agent, or Firm—Wenderoth, Lind and Ponack

[57] ABSTRACT

Novel 17β-(3-furyl)-5β,14β-androstane-3β,14,16β-triol 3-tridigitoxoside, its acylates and acetals having stronger digitalis-like cardiotonic activity and process for preparation thereof by reaction of gitoxin, its acylates or acetals with an active reducing agent.

7 Claims, No Drawings

CARDIOTONIC GLYCOSIDES

This is a continuation-in-part of Ser. No. 833,784 filed June 16, 1969, now abandoned.

The present invention relates to a novel cardiotonic glycoside, its acylates and acetals, and process for preparation thereof.

The novel compounds of the present invention are 17β-(3-furyl)-5β,14β-androstane-3β,14,16β-triol 3-tridigitoxoside of the formula:

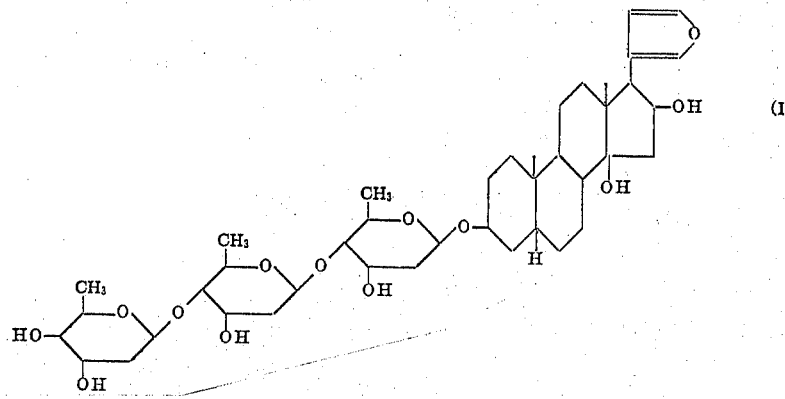

its acylates and acetals.

Preferable acylates of the compound I involve aliphatic carboxylic acylates such as alkanoates e.g., acetates, propionates, valerates, undecanoates, stearates, succinates, acrylates and the like; substituted alkanoates e.g., cyclopentanepropionates, aspartates, phenoxyacetates, haloacetates and the like; aromatic carboxylic acylates such as benzoates, furoates and the like; and inorganic acylates such as carbonic, phosphoric acylates and the like. Preferable acetals involve acetals constituted from the compound of the formula I and carbonyl compounds such as aldehydes e.g., formaldehyde, acetaldehyde, benzaldehyde and the like; and ketones e.g., acetone, methyl ethyl ketone, cyclohexanone, and the like. As the compound of the formula I has six hydroxyl groups in the molecule, the acylates or acetals may possess the same or different one to six acyl groups or acetal groups in the molecule. The hydroxyl groups at position 14 is unreactive to conventional acylation. The partial acylation proceeds in the order of hydroxyl groups locating at positions 3''' or 4''', 16, 4''' or 3''', 3'', 3' and 14. The acetal group may be introduced to 1,2 or 1,3-diol, i.e., at positions 3''',4''' and/or position 14,16.

Representative of the compounds of the present invention are 17β-(3-furyl)-5β,14β-androstane-3β,14,16β-triol 3-tridigitoxoside and its acylates and acetals, for example, 17β-(3-furyl)-5β,14β-androstane-3β,14,16β-triol 3-tridigitoxoside, its esters with an organic acid e.g., pentaacetate, acetals of the compound I with a carbonyl compound e.g., 3''',4'''-acetonide.

The process of the present invention comprises reaction of gitoxin or its acylates or acetals with a reducing agent capable of converting α,β-unsaturated five membered ring lactone into furan ring (e.g., described by the present inventor H. Minato and T. Nagasaki in the Journal of the Chemical Society, page 377 of 1966), according to the following equation for free alcohols.

The starting material of the process involves gitoxin, its mono- or poly-acylates and acetals in which acyl groups and acetal groups are those of the groups cited above relating to the compounds of the present invention. As gitoxin is difficultly soluble in various solvents, acylates or acetals are preferable starting materials, although gitoxin can also be utilized as starting material.

The reduction of the α,β-unsaturated five membered ring lactone is carried out by contacting the starting material with at least one molar equivalent of the reducing agent in an inert solvent at a temperature preferably between about $-100°C$ to $100°C$. The inert solvent is preferably a hydrocarbon e.g., petroleum benzine, petroleum ether, benzene or toluene, a halogenated hydrocarbons e.g., chloroform or chlorobenzene,

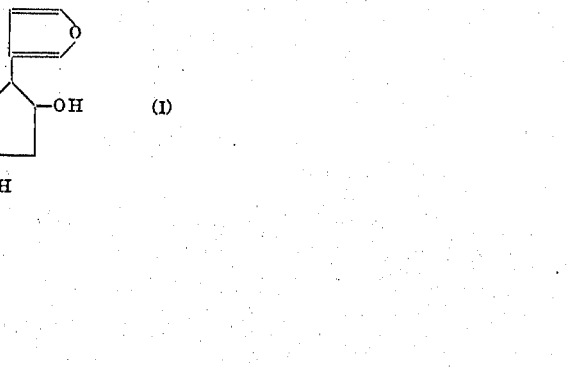
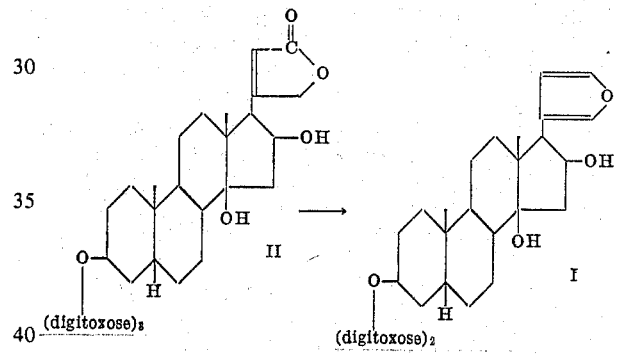

an ether e.g., diethyl ether, tetrahydrofuran, dioxane or ethyleneglycol dimethyl ether, or esters e.g., tertiary-butyl acetate. The reducing agent is preferably an active aluminum hydride compound or its equivalents, for example, aluminum hydride, an alkylaluminum hydride, an alkoxyaluminum hydride, a dialkylaluminum hydride, a dialkoxyaluminum hydride, an alkali metal aluminum hydride, an alkali metal alkylaluminum hydride, an alkali metal alkoxyaluminum hydride, an alkali metal dialkylaluminum hydride, an alkali metal dialkoxyaluminum hydride, an alkali metal trialkylaluminum hydride, an alkali metal trialkoxyaluminum hydride, or the equivalents thereof. Preferable alkyl group of the alkyl or alkoxy group of these reducing agents is methyl, ethyl, propyl, isopropyl, butyl, isobutyl, tert-butyl, pentyl, isopentyl, tert-pentyl, cyclopenyl, hexyl, 3-methylpentyl, cyclohexyl, octyl groups or the like. The alkali metal may be lithium, sodium, potassium or the like. Other preferable reducing agents have alkenyl, aryl, aralkyl groups in place of alkyl group, or they may have other metal atom e.g., calcium, magnesium, barium, zinc or the like in place of alkali metal atom, so far as the agents have substantially same effect on the starting materials as the agents cited above. In the event, the reaction is carried out under atmosphere of an inert gas e.g., nitrogen, argon, helium, and the like, in order to exclude moisture or oxygen. When solid or viscous materials are present in the reaction mixture, especially when the starting material has hydroxyl groups, the medium is preferably stirred for smooth reaction.

Some of the reducing agents hydrolyze partially or completely the acyl groups of the starting material or working up of the reaction mixture hydrolyses acetal group of the starting material to result in the formation of the compound I or of the mixture of the furan compound and partial acylates or acetals.

If required, the product is subjected to conventional hydrolysis, acylation or acetalation. When the product has acyl group, the product is hydrolyzed with an aqueous base e.g., sodium carbonate, potassium carbonate, sodium hydroxide, potassium hydroxide or a quarternally ammonium hydroxide or an agent capable of hydrolyzing acyl group e.g., Grignard reagents, lithium aluminum hydride or the like. Although the acyl group may also be removed with acid, conventional acid hydrolysis conditions are unfavourable as the sugar moiety of the compound is too unstable to the acid hydrolysis condition. When the product has acetal group, the product may be hydrolyzed with an aqueous acid e.g., mineral acids, carboxylic acids, sulfonic acids or ion exchange resins. The acids should be diluted to prohibit hydrolysis of the sugar groups. When the product has hydroxyl group, it may be acylated with a conventional acylating agent e.g., an acid halide, acid anhydride or functional derivatives of acid capable of acylating hydroxyl group of the compounds. The acylation may be carried out in the presence of an acid or base e.g., p-toluenesulfonic acid, sulfuric acid, acetic acid, sodium acetate, pyridine, or the like. The acyl groups to be introduced are those cited above relating to the compound of the present invention. When the product has hydroxyl groups, it may be subjected to acetalation with a conventional carbonyl compound e.g., those cited above relating to compounds of the present invention. The acetalation is carried out in the presence of a conventional catalyzer for acetalation e.g., sulfuric acid, hydrochloric acid, p-toluenesulfonic acid, anhydrous cupper sulfate, melted zinc chloride, anhydrous calcium sulfate, phosphorylated cellulose preparation and the like.

The product prepared by the process described above may be isolated and purified by the conventional methods e.g., dilution with a solvent in which the product is insoluble, filtration, extraction, washing, drying, concentration, recrystallization, chromatography, absorption, elution, etc., The compounds of the present invention show strong cardiotonic activity, accompanied with antiviral activity and cytotoxic effect. The compounds show inotropic effect, chronotropic effect, arrhythmia and finally contractory arrest of heart. For example, $17\beta$-(3-furyl)-$5\beta,14\beta$-androstane- $3\beta,14,16\beta$-triol 3-tridigitoxoside shows about 150 percent of cardiotonic activity when compared with that of $17\beta$-(3-furyl)-$5\beta,14\beta$-androstane-$3\beta,14$-diol 3-tridigitoxoside by the tests on the isolated guinea pig atria. The compound is as active as digitoxin. Namely, the minimum effective concentration was $10^{-8}$ g/ml, and at a concentration of $10^{-5}$ g/ml, four in four of atria stopped within 46 – 96 minutes. It shows more immediate effect than digitoxin and more slower effect than strospeside. The compound is more effective than strospeside in respect of maximal response in contractile amplitude increase. Experiments show that the furan steroids do not exert their activity after conversion into the corresponding lactone steroids of the cardenolide type by the tissues. The lethal dosis of the compound by tests on pigeons is ca. 5.4 mg/kg in contrast to ca. 0.5 mg/kg of digitoxin. The safety margin is improved up to tenfold, when the differences between animals are neglected. All of these data show the compounds are useful as medicines which may be used in place of digitoxin, digoxin or lanatoside C. Moreover, the compounds show antiviral activity in vitro, e.g., to polio virus, influenza virus and vaccinia virus. Further, the $3''',4'''$-acetonide of the compound I is as active as the compound I and the pentaacetate of the compound I is cardiotonic at concentration of $10^{-5}$ g/ml at which concentration, the amplitude of heart contractile increased up to 50 percent when tested on guinea pig atria.

These activities show the compounds of the present invention are useful for their pharmacological activities. For example, they are utilized for treatment of heart diseases, such as congestive heart caused by heart failure e.g., valvular affection, hypertension, arteriosclerosis, myocardial infarction, etc., disorders in water balance such as edema, anasarca, serpoeritoneum, hydrothorax, dyspnea, etc., caused by heart failure or arrhythmia e.g., auricular fibrillation, absolute arrhythmia, extrasystoles, tachycardia, auricular flutter, etc., acute heart failure, acute congestive heart, acute heart hyposthenia or tonus disorder, in a daily dosis of 10 mg to 0.1 $\gamma$/kg body weight for human and veterinary use. The content of the compound in drugs is preferably uniform to make a unit dose tablet, pills, capsules or the like to use as maintenance dosis and/or saturation or digitalization.

The compounds of the present invention may be utilized in a wide variety of oral or parenteral dosage forms, alone or in admixture with co-acting agents. They may be administered in a solid composition such as tablets, capsules, pills, if required in a unit dosage form, powders, granules, or the like or in a liquid composition such as injection, ointments, suspensions, solutions, emulsions, syrups, elixirs, oils or the like. They may be flavored or colored, and tablets, granules or pills may be coated. The preparations are prepared by the conventional methods in conjunction with a solid or liquid pharmaceutical excipient.

The compounds are also utilized as intermediates for preparation of useful compounds. For example, $17\beta$-(3-furyl)-$5\beta,14\beta$-androstane-$3\beta,14,16\beta$-triol 3-tridigitoxoside $3''',4'''$-cyclic carbonate is esterified preferantially at $16\beta$-hydroxyl group, and then subjected to partial hydrolysis to afford the 16-ester, which is useful as a cardiotonic.

The compounds are unstable in oxidative medium at higher temperature. The preparation is preferably stored in an inert gas or it may be made air-proof preparation.

The following examples are given by way of illustration only and not intended as limitation of the scope of the present invention, many apparent variations of which are possible without departing from the spirit and scope of the present invention.

EXAMPLE 1

To a suspension of 2.0 g of gitoxin in 80 ml of tetrahydrofuran cooled at −30°C to −25°C is added under nitrogen atmosphere a solution of 1.5 g of diisobutylaluminum hydride in 5 ml of dry tetrahydrofuran. After 5 hours, 20 ml of 2N-sulfuric acid in small portions is added to the reaction mixture maintaining at from −15°C to −5°C and stirred for further 10 minutes. The mixture is poured into ice-water containing common salt and is extracted with chloroform. The extract is dried and evaporated to remove solvents. Purification of the residue by thin-layer chromatography gives 0.68 g of 17β-(3-furyl)-5β,14β-androstane-3β,14,16β-triol 3-tridigitoxoside, m.p. 215° – 220°C.

EXAMPLE 2

To a solution of 1.920 g of gitoxin pentaacetate in 20 ml of dry tetrahydrofuran cooled at −35°C to −25°C is added under nitrogen atmosphere a solution of 1.35 g of diisobutyl-aluminum hydride in 5 ml of dry tetrahydrofuran. The reaction is followed by thin-layer chromatogram and the reaction is completed after 3 hours. Twenty milliliters of 2N-sulfuric acid in small portions is added to the reaction mixture maintaining at from −15°C to −50°C and stirred for further 10 minutes. The mixture is poured into ice-water containing common salt and is extracted with chloroform. The extract is dried and passed through a filter pad of 10 g of neutral alumina and the filtrate is concentrated in vacuo to give 1.70 g of residue which is a mixture of 17β-(3-furyl)-5β,14β-androstane-3β,14,16β-triol 3-tridigitoxoside and its penta-, tetra-, tri-, di- and mono-acetates.

The residue obtained above is dissolved in 16 ml of methanol and is mixed with a solution of 1 g of sodium hydroxide in 4 ml of water. The mixed solution is refluxed for 30 minutes under nitrogen atmosphere. The cooled solution is extracted with chloroform. The extract solution is washed with diluted hydrochloric acid and water, dried over anhydrous sodium sulfate and evaporated in vacuo. Recrystallization of the residue from a mixture of chloroform and ether affords 1,080 g of 17β-(3-furyl)-5β,14β-androstane-3β,14,16β-triol 3-tridigitoxoside, m.p. 215° – 220°C. IR: $\nu_{max}^{CHCl_3}$ 3,520, 1,445, 1,403, 1,382, 1,317, 1,160, 1,128, 1,070, 1,010, 867 cm$^{-1}$. Anal. Calcd. for $C_{41}H_{64}O_{13}$ 3H$_2$O: C, 60.03; H, 8.60. Found: C, 60.02; H, 8.31.

EXAMPLE 3

To a solution of 2.0 g of gitoxin-3''',4'''-acetonide in 15 ml of tetrahydrofuran is added under nitrogen atmosphere a solution of 1.35 g of diisobutylaluminum hydride in 5 ml of dry tetrahydrofuran. After one hour, 30 ml of 2N-sulfuric acid in small portions is added to the reaction mixture keeping at about −5°C. The mixture is poured into ice-water and extracted with chloroform. The extract solution is washed with water, dried and evaporated in vacuo to afford 1.503 g of 17β-(3-furyl)-5β,14β-androstane-3β,14,16β-triol 3-tridigitoxoside 3''',4'''-acetonide, m.p. 236°C. The acetonide is dissolved in 10 ml of 70 percent aqueous acetic acid and heated on water bath for 15 minutes. The reaction mixture is extracted with chloroform. The extract solution is washed successively with water, 5 percent aqueous sodium hydrogen carbonate and water, dried over anhydrous sodium sulfate and evaporated to remove solvent. Recrystallization of the residue from a mixture of chloroform and ether affords 1.213 g of 17β-(3-furyl)-5β,14β-androstane-3β,14,16β-triol 3-tridigitoxoside, m.p. 215 – 220°C.

EXAMPLE 4

To a solution of 1.0 g of gitoxin-16,4'''-diacetate in 13 ml tetrahydrofuran cooled at −30°C to −25°C is added a solution of 1.664 g of diisobutylaluminum hydride in 8 ml of tetrahydrofuran in several portions under nitrogen atmosphere with stirring. After 1.5 hours, the reaction mixture is mixed with 20 ml of 2N-sulfuric acid and stirred for 15 minutes at −5°C. The mixture is poured into ice-water and extracted with chloroform. The extract solution is washed with 5 percent aqueous solution of sodium hydrogen carbonate and water, dried and evaporated at 20°C to remove the solvent. The crude product, which may be a mixture of 17β-(3-furyl)-5β,14β-androstane-3β,14,16β-triol 3-tridigitoxoside accompanied with a trace amount of its acetate, is subjected to hydrolysis with 0.6 g of potassium hydroxide in a mixture of 16.0 ml of methanol and 4.0 ml of water by refluxing for 30 minutes under nitrogen atmosphere. The mixture is poured in water and extracted with chloroform. The extract solution is washed with water, dried over anhydrous sodium sulfate and evaporated to remove solvent. Recrystallization of 941 mg of the residue from a mixture of chloroform, ethanol and petroleum ether affords 585 mg of pure 17β-(3-furyl)-5β,14β-androstane-3β,14,16β-triol 3-tridigitoxoside, m.p. 213° – 218°C.

EXAMPLE 5

A mixture of 200 mg of 17β-(3-furyl)-5β,14β-androstane-3β,14,16β-triol 3-tridigitoxoside, 2 ml of pyridine and 1 ml of acetic anhydride is kept at 24 hours at room temperature. The reaction mixture is evaporated in vacuo to remove pyridine and acetic anhydride. Swirling of the residue with a mixture of acetone and ether gives amorphous pentaacetate. IR: $\nu_{max}^{CHCl_3}$ 3,560 – 3,400, 1,738, 1,371, 1,315, 1,153, 1,093, 1,050, 1,015, 944, 915, 867 cm$^{-1}$.

EXAMPLE 6

To a stirred solution of 1.00 g of gitoxin-3''',4'''-cyclic carbonate in 50 ml of dry tetrahydrofuran cooled at −35°C to −25°C, is added dropwise a solution of 0.63 g of diisobutylaluminum hydride in 3 ml of dry tetrahydrofuran under nitrogen atmosphere and the mixture is stirred at the same temperature for 3 hours. The reaction mixture is neutralized with acetic acid, mixed with 1 N-sulfuric acid, and extracted with chloroform. The chloroform layer is dried and evaporated under reduced pressure to remove the solvent. Purification of 0.90 g of the residue by chromatography over 10 g of alumina affords 0.35 g of 17β-(3-furyl)-5β,14β-androstane-3β,14,16β-triol-3-tridigitoxoside (m.p. 215°–220°C; Yield: 36.9 percent) and 0.12 g of its 3''',4'''-cyclic carbonate (m.p. 141°–143°C; Yield: 12.2 percent).

EXAMPLE 7

To a stirred solution of 275 mg of 17β-(3αfuryl)-5β,14β-androstane-3β,14,16β-triol-3-tridigitoxoside in 15 ml of dry pyridine cooled at −10°C to −20°C, is added 3.6 ml of a solution of phosgene in pyridine (146 mg/ml) in three portions. After 30 minutes, the reaction mixture is mixed with ice and extracted with chloroform. The extract solution is washed with 5 percent hydrochloric acid, 5 percent aqueous solution of sodium hydrogen carbonate and water in order, dried over anhydrous sodium sulfate and evaporated under reduced pressure to remove the solvent. Purification of 295 mg of the residue by thin-layer chromatography over silica gel utilizing a mixture of chloroform and acetone (2:1) as developing solvent, and recrystallization from a mixture of chloroform and ether affords 211 mg of the crystals of the 3''',4'''-cyclic carbonate, m.p. 141°–143°C.

I claim:

1. 17β-(3-furyl)-5β,14β-androstane-3β,14,16β-triol-3-tridigitoxoside and its 3''',4'''-cyclic carbonate, pharmaceutically acceptable carboxylic acylates containing 1 to 18 carbon atoms, and pharmaceutically acceptable 3''',4''''-acetals in which the acetal carbonyl moiety contains 1 to 7 carbon atoms.

2. A compound according to claim 1, that is 17β-(3-furyl)-5β,14β-androstane-3β,14,16β-triol-3-tridigitoxoside.

3. A compound according to claim 1 wherein the carboxylic acylates are selected from the group consisting of alkanoates, succinates, acrylates, cyclopentanepropionates, aspartates, phenoxyacetates, haloacetates, benzoates and furoates.

4. A compound according to claim 3, that is 17β-(3-furyl)-5β,14β-androstane-3β,14,16β-triol-3tridigitoxoside 16,3',3'', 3''',4''''-pentaacetate.

5. A compound according to claim 1, that is 17β-(3-furyl)-5β,14β-androstane-3β,14,16β-triol-3-tridigitoxoside-3''',4''''-cyclic carbonate.

6. A compound according to claim 1, wherein the 3''',4''''-acetal carbonyl moiety is that from a carbonyl compound selected from the group consisting of formaldehyde, acetaldehyde, benzaldehyde, acetone, methyl ethyl ketone and cyclohexanone.

7. A compound according to claim 6, that is 17β-(3-furyl)-5β,14β-androstane-3β,14,16β-triol-3-tridigitoxoside-3''',4''''-acetonide.

* * * * *